(12) United States Patent
Bradley

(10) Patent No.: US 6,810,078 B2
(45) Date of Patent: Oct. 26, 2004

(54) BLIND RATE DETERMINATION

(75) Inventor: Wayne H. Bradley, West Chicago, IL (US)

(73) Assignee: Prairiecomm, Inc., Rolling Meadows, IL (US)

(*) Notice: Subject to any disclaimer, the term of this patent is extended or adjusted under 35 U.S.C. 154(b) by 757 days.

(21) Appl. No.: 09/733,670

(22) Filed: Dec. 8, 2000

(65) Prior Publication Data

US 2002/0080725 A1 Jun. 27, 2002

(51) Int. Cl.[7] ............................................. H03M 13/00
(52) U.S. Cl. ................... 375/225; 714/774; 714/780; 714/795; 714/789; 375/225; 375/341; 375/262
(58) Field of Search ............................... 375/225, 341, 375/262; 370/335, 232, 342; 714/795, 789, 780, 774

(56) References Cited

U.S. PATENT DOCUMENTS

| | | | | |
|---|---|---|---|---|
| 5,627,845 A | * | 5/1997 | Asano et al. ............... 714/795 |
| 5,689,511 A | * | 11/1997 | Shimazaki et al. ......... 370/545 |
| 5,710,784 A | * | 1/1998 | Kindred et al. ............. 375/262 |
| 5,729,557 A | | 3/1998 | Gardner et al. .............. 371/41 |
| 5,771,226 A | * | 6/1998 | Kaku .......................... 370/232 |
| 5,796,757 A | | 8/1998 | Czaja .......................... 371/146 |
| 6,064,678 A | * | 5/2000 | Sindhushayana et al. .. 370/470 |
| 6,097,716 A | | 8/2000 | Abrishamkar ............... 370/342 |
| 6,112,325 A | | 8/2000 | Burshtein .................... 714/774 |
| 6,175,590 B1 | * | 1/2001 | Stein ........................... 375/225 |
| 6,233,230 B1 | * | 5/2001 | Chan ........................... 370/335 |
| 6,567,392 B1 | * | 5/2003 | Rubin et al. ................ 370/342 |
| 6,567,428 B1 | * | 5/2003 | Rubin et al. ................ 370/538 |
| 6,567,466 B1 | * | 5/2003 | Ovalekar et al. ........... 375/225 |
| 6,687,233 B1 | * | 2/2004 | Chen et al. .................. 370/253 |

FOREIGN PATENT DOCUMENTS

GB      2361851 A   *   4/2000

* cited by examiner

Primary Examiner—Stephen Chin
Assistant Examiner—Sudhanshu C. Pathak
(74) Attorney, Agent, or Firm—Foley & Lardner (57) ABSTRACT

A blind rate determination system generates syndromes for a received symbol stream and, based on the syndromes, calculates a confidence metric associated with possible data rates. The confidence metrics are compared to one another and to a threshold and the data rate associated with the best confidence metric is selected as the data rate at which the symbol stream was encoded.

24 Claims, 9 Drawing Sheets

BLIND RATE DETERMINATION

TECHNICAL FIELD

The present invention is directed to communication receivers and, more particularly, to blind rate determination in communication receivers.

BACKGROUND ART

Digital communication systems typically include a mobile unit, which may be embodied in a digital cellular telephone or any other portable communication device, and an infrastructure unit, which may be embodied in a cellular base station or any other suitable communication hardware. During operation, the mobile unit and the infrastructure unit exchange digital information using one of a number of communication protocols. For example, the mobile and infrastructure units may exchange information according to a time division multiple access (TDMA) protocol or a code division multiple access (CDMA) protocol. The details of such protocols are disclosed in the IS-136 and IS-95 communication standards, which are available from the Telecommunication Industry Association (TIA).

Mobile and infrastructure units broadcast information at various rates in the CDMA system. For example, data rates in a CDMA system may vary between 1.2 and 9.6 kilobits per second (kbps). In accordance with the IS-95 specification, receivers in the mobile and infrastructure units do not have a priori knowledge of the data rate of the information that they are about to receive. Accordingly, CDMA receivers must blindly determine the rate at which they are receiving data.

One technique of blind rate determination disclosed in U.S. Pat. No. 5,796,757 to Czaja includes decoding a received signal and determining, for each possible data rate, a total cumulative metric associated with a most likely path through a decoder trellis. The total cumulative metric is determined by, among other things, processing branch metrics to determine survivor metrics, which requires the received signal to be decoded for each possible data rate.

Another blind rate determination technique disclosed in U.S. Pat. No. 6,112,325 to Burshtein includes the use of specific quality metrics to determine the rate at which a digital receiver receives information. In particular Burshtein discloses that the quality metrics may be a rate at which a function of signal to noise is optimized or the quality metrics may be cyclic redundancy check errors.

An additional blind rate determination technique includes Viterbi decoding a received signal for each of the possible data rates, convolutionally encoding the decoded signals and comparing the results of the convolutional encoding with the received signal. Typically, such a comparison is a straight bit-wise comparison that looks for the minimum bit error rate and adopts the rate associated with the minimum bit error rate. While this is a good approximation for deciding the rate at which the data was sent, the results of a bit-wise comparison are simply positive or negative indications of matches. Such an approach does not use soft decision or confidence information to make a rate determination. Further, problems may be encountered when a very low data rate is used because there are fewer bits per frame over which the bit-wise comparison may be taken. For example, a 20 millisecond (ms), 384 bit frame encoded with a 1.2 kbps data rate may contain only 16 bits of meaningful information over which bit wise comparisons may be made. Additionally, some bits in a frame may be used as power control bits to provide a mobile unit information on whether the mobile unit should increase or decrease its transmit power level to optimize the transmit level of the mobile unit relative to the environment. Typically, for rate determination purposes, the power control bits are all set to zero. Accordingly, fewer bits are available to compare when power control bits are used, which further reduces the reliability of rate determination based on bit error rate.

SUMMARY OF THE PREFERRED EMBODIMENTS

According to one aspect, the present invention may be embodied in a method of determining a data rate at which data is encoded within a digital signal. The method may include selecting an assumed data rate at which data may be encoded within the digital signal, determining a syndrome of the digital signal for the assumed data rate and determining a confidence metric related to the syndrome of the digital signal. The method may also include comparing the confidence metric to a threshold and producing an indication that the assumed data rate is the data rate at which data is encoded within the digital signal if the confidence metric satisfies the threshold.

According to a second aspect, the present invention may be embodied in a method of determining a data rate at which data is encoded within a digital signal. The method may include selecting a plurality of assumed data rates at which data may be encoded within the digital signal, determining a plurality of syndromes of the digital signal, wherein each one of the plurality of syndromes is related to each one of the plurality of assumed data rates and determining a plurality of confidence metrics, wherein each one of the plurality of confidence metrics is related to each one of the plurality of syndromes. Additionally, the method may include determining a best confidence metric of the plurality of confidence metrics, wherein the best confidence metric has a related assumed data rate, comparing the best confidence metric to a threshold and producing an indication that the assumed data rate related to the best confidence metric is the data rate at which data is encoded within the digital signal if the best confidence metric satisfies the threshold.

According to a third aspect, the present invention may be embodied in a system adapted to determine a data rate at which data is encoded within a digital signal. The system may include a derepeater adapted to process the digital signal according to an assumed data rate at which data may be encoded within the digital signal, a syndrome determiner coupled to the derepeater and adapted to determine a syndrome of the digital signal for the assumed data rate and to determine a confidence metric related to the syndrome of the digital signal and a comparator coupled to the syndrome determiner and adapted to compare the confidence metric to a threshold and to produce an indication that the assumed data rate is the data rate at which data is encoded within the digital signal if the confidence metric satisfies the threshold.

According to a fourth aspect, the present invention may be embodied in a system adapted to determine a data rate at which data is encoded within a digital signal. The system may include a derepeater adapted to process the digital signal according to a plurality of assumed data rates at which data may be encoded within the digital signal and a confidence metric determiner coupled to the derepeater and adapted to determine a plurality of syndromes of the digital signal, wherein the syndrome determiner is adapted to determine a plurality of confidence metrics based on the plurality of syndromes. The system may also include a comparator coupled to the confidence metric determiner and adapted to determine a best confidence metric of the plurality of confidence metrics, to compare the best confidence metric to a threshold and to produce an indication that the assumed data rate related to the best confidence metric is the rate at which data is encoded within the digital signal if the best confidence metric satisfies the threshold.

According to a fifth aspect, the present invention may be embodied in a rate determiner for use in a receiver including a processor, wherein the rate determiner is adapted to determine a data rate at which data is encoded within a digital signal. The rate determiner may include a memory, a first set of instructions stored on the memory and adapted to cause the processor to select an assumed data rate at which data may be encoded within the digital signal and a second set of instructions stored on the memory and adapted to cause the processor to determine a syndrome of the digital signal for the assumed data rate. The rate determiner may also include a third set of instructions stored on the memory and adapted to cause the processor to determine a confidence metric related to the syndrome of the digital signal, a fourth set of instructions stored on the memory and adapted to cause the processor to compare the confidence metric to a threshold and a fifth set of instructions stored on the memory and adapted to cause the processor to produce an indication that the assumed data rate is the data rate at which data is encoded within the digital signal if the confidence metric satisfies the threshold.

According to a sixth aspect, the present invention may be embodied in a rate determiner for use in a receiver including a processor, wherein the rate determiner is adapted to determine a rate at which data is encoded within a digital signal. In such an embodiment, the rate determiner may include a memory, a first set of instructions stored on the memory and adapted to cause the processor to select a plurality of assumed data rates at which data may be encoded within the digital signal and a second set of instructions stored on the memory and adapted to cause the processor to determine a plurality of syndromes of the digital signal related to the assumed data rates. The rate determiner may also include a third set of instructions stored on the memory and adapted to cause the processor to determine a plurality of confidence metrics, wherein each one of the plurality of confidence metrics is related to the plurality of syndromes and a fourth set of instructions stored on the memory and adapted to cause the processor to determine a best confidence metric of the plurality of confidence metrics, wherein the best confidence metric has a related assumed data rate. Further, the rate determiner may include a fifth set of instructions stored on the memory and adapted to cause the processor to compare the best confidence metric to a threshold and a sixth set of instructions stored on the memory and adapted to cause the processor to produce an indication that the assumed data rate related to the best confidence metric is the data rate at which data is encoded within the digital signal if the best confidence metric satisfies the threshold.

These and other features of the present invention will be apparent to those of ordinary skill in the art in view of the description of the preferred embodiments, which is made with reference to the drawings, a brief description of which is provided below.

DESCRIPTION OF THE PREFERRED EMBODIMENTS

As described hereinafter, a blind rate determination system generates syndromes for a received symbol stream at various data rates and, based on the syndromes, calculates a confidence metric associated with each possible data rate. The confidence metrics may be compared to one another and to thresholds so that the data rate associated with the best confidence metric may be selected as the data rate at which the symbol stream was encoded.

As described in detail hereinafter, the syndromes are determined by multiplying symbols of the symbol stream by polynomials used to encode certain symbols of the symbol stream. For example, all odd symbols, which were encoded at a transmitter with, for example, polynomial g1 will be multiplied by polynomial g2 to produce a first syndrome. Likewise, all even symbols, which were encoded at the transmiter with, for example, polynomial g2 will be multiplied by polynomial g1 to produce a second syndrome. If the syndromes are calculated for the appropriate data rate, the first and second syndromes will be very similar. Conversely, if the syndromes are calculated for an incorrect data rate, the first and second syndromes will not be very similar. The confidence metric, therefore, may be determined by, for example, a bit-wise comparison of the first and second syndromes.

Figure 1:
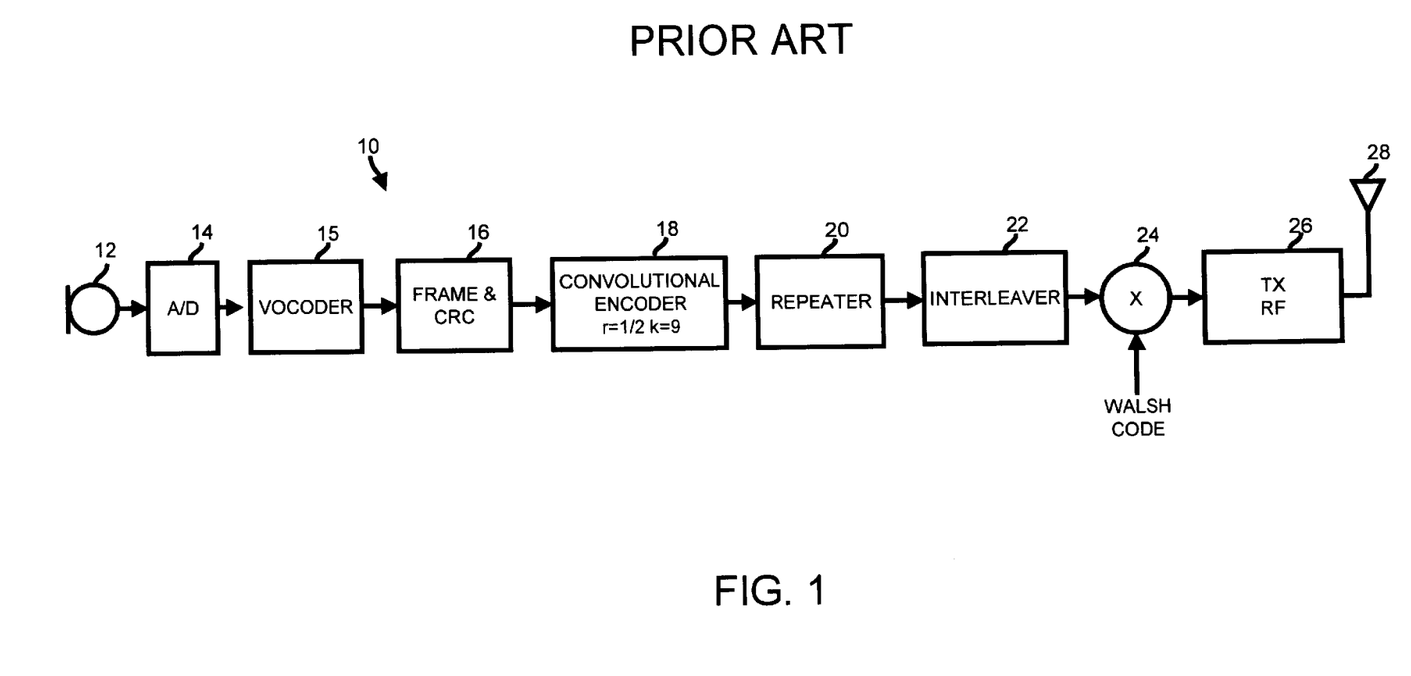
FIG. 1 is an exemplary block diagram of a transmit lineup of a communication system.

Turning now to FIG. 1, a transmit lineup 10, such as a lineup that may be used in a cellular base station of a code division multiple access (CDMA) system operating in accordance with the IS-95 standard, may include a microphone 12 coupled to an analog to digital converter (A/D) 14, a voice coder (vocoder) 15, a frame and cyclic redundancy check (CRC) module 16 and an encoder 18. The transmit lineup 10 may further include a repeater 20 coupled to an interleaver 22, the output of which is coupled to a multiplier 24 that multiplies the output of the interleaver 22 by a Walsh code. The output of the multiplier 24 may be coupled to transmitter radio frequency (RF) circuitry 26, which is further coupled to an antenna 28.

In operation, the microphone 12 and the A/D 14 cooperate to produce a bitstream representative of voice that is received at the microphone 12. As will be appreciated by those having ordinary skill in the art, the microphone 12 may be replaced with a conventional telephone line carrying voice or any other analog information. In such a case, the information on the telephone line would be sampled, or quantized by the A/D 14 to produce a bitstream. If the A/D 14 samples a signal representative of voice, the output of bitstream of the A/D 14 may be coupled to the vocoder 15, which, in any known manner, encodes the bitstream representative of voice for transmission through a communication channel. Alternatively, as will also be appreciated by those having ordinary skill in the art, the microphone 12, the A/D 14 and, optionally, the vocoder 15 could be eliminated in favor of a data source that outputs a digital bitstream that does not need to be sampled to create a bitstream. Such a data source could be coupled to the vocoder 15 or could be coupled directly to the frame and CRC module 16.

The bitstream, whether it is produced by the A/D 14 and the vocoder 15 or is provided by some other data source (not shown), may be coupled to the frame and CRC module 16, which processes the bitstream in a known manner. As will be appreciated by those having ordinary skill in the art, the output of the frame and CRC module 16 may be a bitstream that is partitioned into frames that may be, for example, 20 ms in length and 384 bits long. Additionally, the bitstream from the frame and CRC module 16 may have cyclic redundancy information, or any other suitable error detecting and correcting information, appended thereto. The output bitstream from the frame and CRC module 16 may have bit rates of, for example, 1.2, 2.4, 4.8 or 9.6 kilobits per second (kbps). Alternatively, as will be appreciated by those having ordinary skill in the art, the bitstream produced by the frame and CRC module 16 may have any other suitable bit rate and the foregoing enumerated bit rates are, therefore, to be construed as exemplary and not as limiting. The bit rate of the bitstream from the frame and CRC module 16 may change on a frame-by-frame basis depending on various conditions within the communication system such as, for example, noise, interference, multipath interference and the like.

The bitstream produced by the frame and CRC module 16 may be coupled to the encoder 18, which converts the bitstream into a symbol stream. The encoder 18 may be, for example, a rate ½ convolutional encoder or may be any other suitable encoder using any suitable coding scheme. As will be appreciated by those having ordinary skill in the art, the encoder 18 may multiply the bitstream from the frame and CRC module 16 by various polynomials to encode the bitstream into a symbol stream. For example, each bit of the bitstream may be multiplied by polynomials g1 and g2, which may be, for example, $1+D^2$ and $1+D+D^2$, respectively, wherein "D" represents a one bit delay and "$D^2$" represents a two bit delay. The results of each bit being multiplied by each polynomial are combined together so that the odd bits of the bitstream from the frame and CRC module 16 were multiplied by g1 and the even bits of the bitstream were multiplied by g2. As the encoder 18 encodes the bitstream from the frame and CRC module 16, the encoder 18 produces a symbol stream. If the encoder 18 is a rate ½ encoder, the symbol stream will have a symbol rate that is twice the bit rate of the bitstream that was provided to the encoder 18. For example, considering a rate ½ encoder, input bitstreams having bit rates of 1.2, 2.4, 4.8 and 9.6 kbps correspond to symbol streams having symbol rates of 2.4, 4.8, 9.6 and 19.2 kilosymbols per second (ksps), respectively.

The symbol stream from the encoder 18 may be coupled to the repeater 20, which, regardless of the symbol rate of the symbol stream produced by the encoder 18, produces an output having a symbol rate of 19.2 ksps by, if necessary, repeating various ones of the symbols produced by the encoder 18. For example, if the bitstream from the frame and CRC module 16 had a bit rate of 1.2 kbps and the encoder processed the bitstream to produce a symbol stream having a symbol rate of 2.4 ksps, the repeater 20 will repeat each symbol in the symbol stream eight times to convert the 2.4 ksps symbol stream into a 19.2 ksps symbol stream. Alternatively, by way of further example, if the bitstream from the frame and CRC module 16 has a bit rate of 9.6 kbps and encoder 18 processes the bitstream to produce a symbol stream having a symbol rate of 19.2 ksps, the repeater 20 will not repeat any of the symbols in the symbol stream because the symbol rate of the symbol stream is already 19.2 ksps.

The output of the repeater 20, which may be referred to as a repeated and encoded symbol stream, is coupled to the interleaver 22 which, in a known manner, interleaves various temporal portions of the symbol stream to protect against burst errors in the communication channel. After the symbol stream has been interleaved, it is coupled to the multiplier 24, which multiplies the symbol stream by the Walsh code. The Walsh code, as will be appreciated by one having ordinary skill in the art, may be a 64 symbol code designed to be mutually orthogonal with other Walsh codes. Accordingly, the mutually orthogonal Walsh codes enable various CDMA transmitters and receivers to occupy the same geographical space and frequency bandwidth without significantly interfering with one another. In addition to being multiplied by the Walsh code, the symbol stream from the interleaver 22 may also be multiplied by various other short and long codes, which are well known to those having ordinary skill in the art. Of course, as will be readily appreciated by those having ordinary skill in the art, other signals besides Walsh codes could be multiplied with the output of the interleaver 22.

The output of the multiplier 24, which may have various other data bits or symbols used for power control multiplexed therewith, may be coupled to the transmitter RF circuitry 26. According to conventionally known techniques, the transmitter RF circuitry 26 modulates a carrier signal based on the output of the multiplier 24 and may perform upconversion to convert the output of the multiplier 24 to an RF signal appropriate for transmission by the antenna 28. For example, the transmitter RF circuitry 26 may modulate an RF carrier using, for example, quadrature phase shift keying (QPSK), differential quadrature phase shift keying (DQPSK), binary phase shift keying (BPSK), quadrature amplitude modulation (QAM) or any other suitable modulation technique. Additionally, the modulated carrier signal may be upconverted to a signal having a frequency in the ranges of, for example, 450, 800, 900, 1800, 1900 megahertz (MHz) or any other suitable frequency range.

While the foregoing describes certain aspects of the transmit lineup 10 of a CDMA system, further detail regarding such a system may be found in the IS-95 specification, which is incorporated herein by reference and is available from the TIA.

Figure 2A:
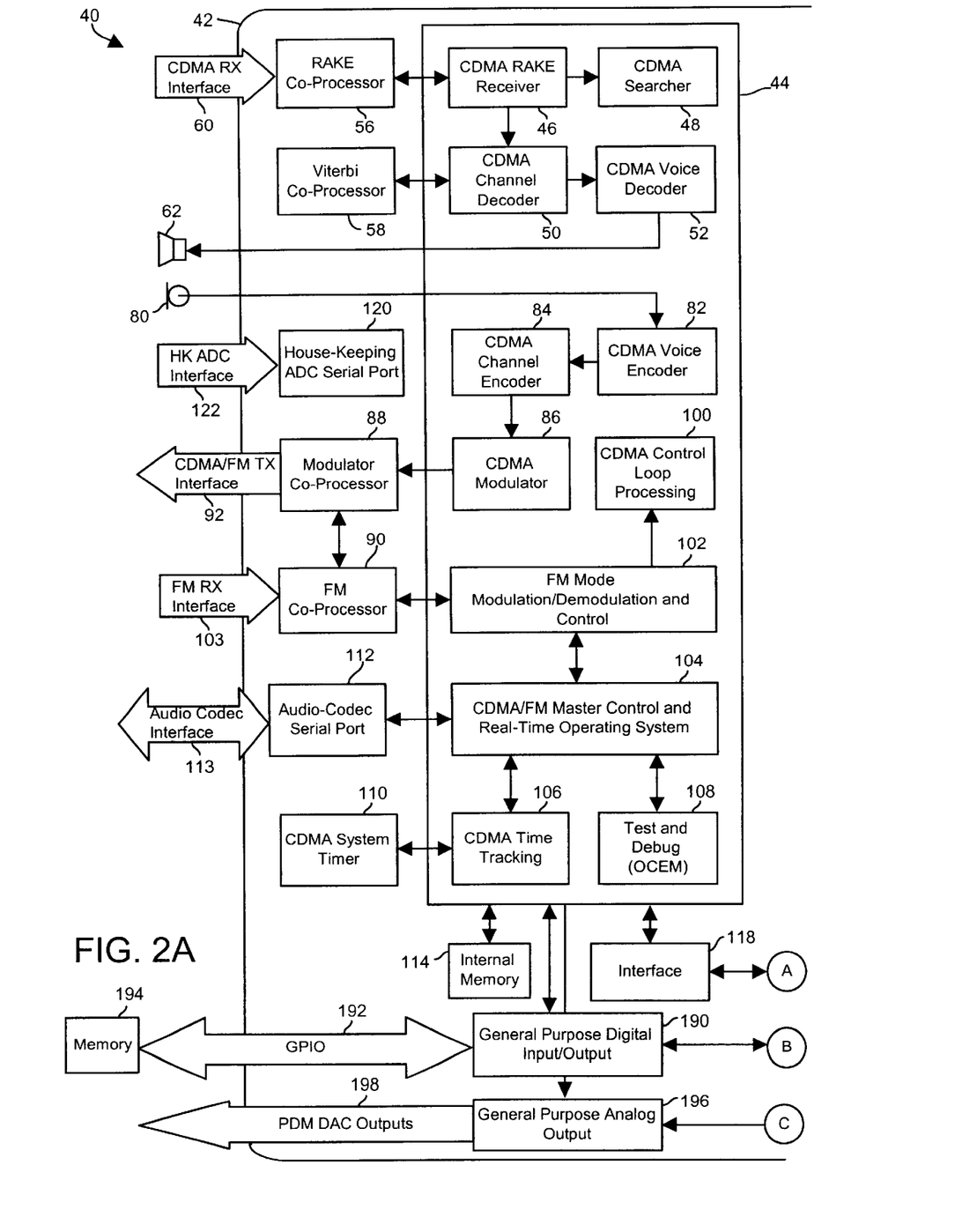
FIGS. 2A and 2B form an exemplary block diagram of a mobile communication system.
Figure 2B:
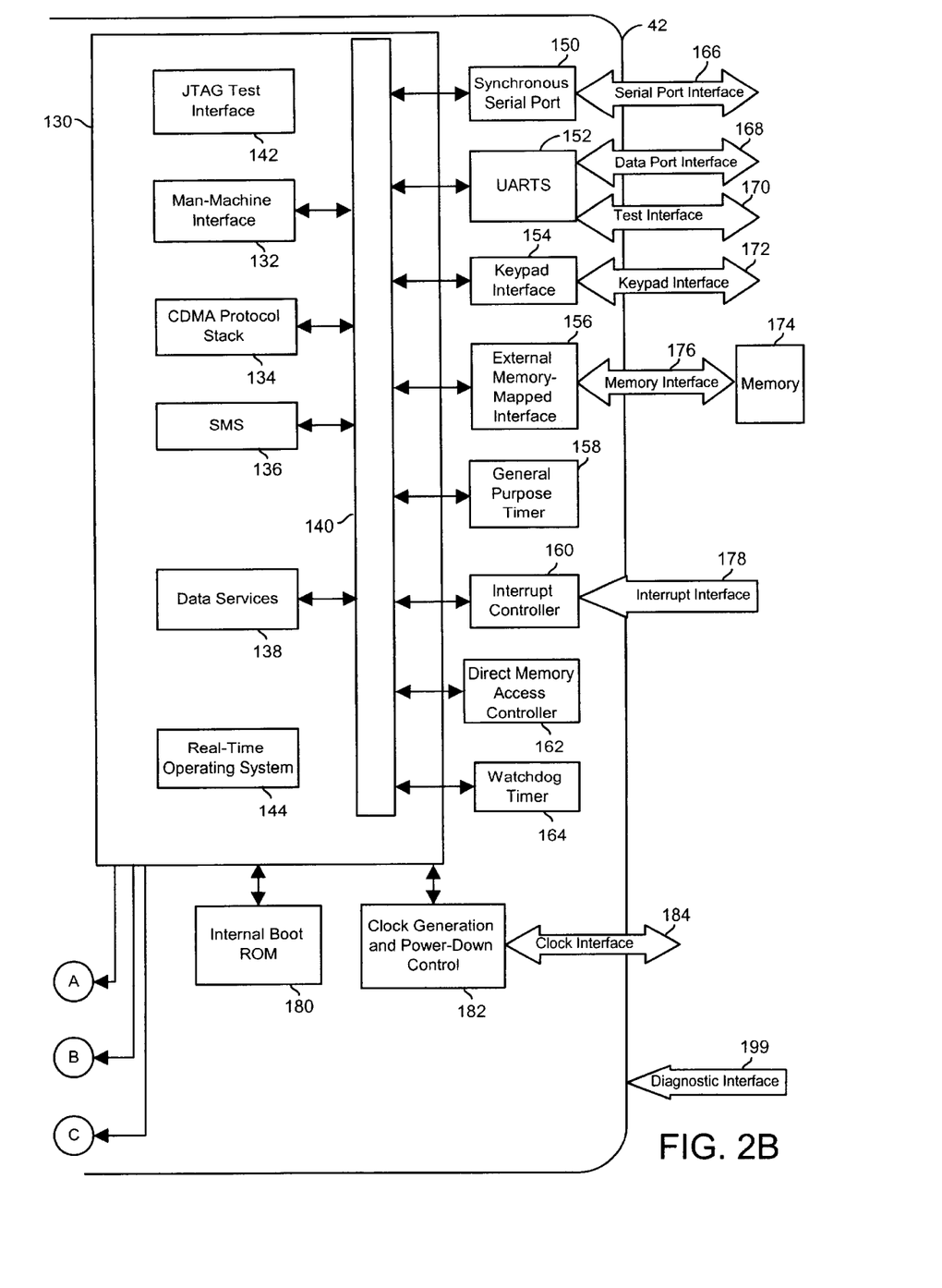

As shown in FIGS. 2A and 2B, a mobile communication system 40 may include a transceiver integrated circuit (IC) 42 and various other components external to the transceiver IC 42. Such a communication system may be used in a digital cellular telephone or in any other device that is adapted to receive digital communications that may operate on a CDMA system. In particular, as shown in FIG. 2A, the transceiver IC 42 may include a digital signal processing (DSP) portion 44 that may perform various voice and data processing functions. The DSP portion 44 may include a CDMA RAKE receiver 46, a CDMA searcher 48, a CDMA channel decoder 50 and a CDMA voice decoder 52, all of which collectively form a receive path. External to the DSP portion 44, the receive path may further include a RAKE co-processor 56 that may be interfaced to the CDMA RAKE receiver 46 and a Viterbi co-processor 58, which may also be interfaced to the CDMA channel decoder 50. Signals from an RF front end (not shown) may be coupled to the RAKE co-processor 56 via a CDMA RX interface 60. In a known manner, the RAKE co-processor 56 processes information from the front end by, for example, correlating such information against a known pseudorandom sequence and integrating and dumping the results of the integration. The results of the processing carried out by the RAKE co-processor 56 are coupled to the CDMA RAKE receiver 46. The CDMA searcher 48, which may be coupled to the CDMA RAKE receiver 46, time aligns a pseudorandom sequence generator of the transceiver IC 42 with the pseudorandom sequence received from the transmit lineup 10.

The CDMA RAKE receiver 46 processes the output from the RAKE co-processor 56 to generate soft weighted symbols. The CDMA RAKE receiver 46 may perform such a function through the use of maximal ratio combining techniques. The soft weighted symbols may be coupled from the CDMA RAKE receiver 46 to the CDMA channel decoder 50, which is of particular interest and is described in further detail hereinafter in conjunction with FIGS. 3–8. The CDMA channel decoder 50 cooperates with the Viterbi co-processor 58 to determine the maximum likelihood word that was transmitted by the transmit lineup 10 and couples the maximum likelihood word to the CDMA voice decoder 52, which appropriately decodes the maximum likelihood word into audio that may be coupled to a speaker 62. Accordingly, the receive lineup from the RF front end (not shown) through the speaker 62 forms a path for audio to be presented to the user of the mobile communication system 40.

The transceiver IC 42 and, in particular, the DSP portion 44 also includes a transmit path that enables a user of the mobile communication system 40 to transmit audio to a receive lineup (not shown), which may be embodied in a cellular infrastructure cell site or the like. In particular, a user may speak into a microphone 80 that converts the voice of the user into an electrical signal, which is coupled to a CDMA voice encoder 82. The encoded voice signal is coupled from the CDMA voice encoder 82 to a CDMA channel encoder 84, which further encodes the encoded voice signal for transmission through a communication channel from the mobile communication system 40 to a receive lineup (not shown). The output of the CDMA channel encoder 84 is coupled to a CDMA modulator 86, which interacts with a modulator co-processor 88 and an FM co-processor 90 to appropriately modulate the channel encoded signal from the CDMA channel encoder 84 for broadcast over the communication channel. The output of the modulator co-processor 88 is coupled to a transmitter front end (not shown), via a CDMA/FM TX interface 92. The CDMA modulator 86 may modulate the signal from the CDMA channel encoder 84 using any known technique such as quadrature phase shift keying (QPSK) or any other suitable modulation scheme that may be used in connection with a CDMA communication system operating in compliance with the IS-95 standard.

As further shown in FIG. 2A, the DSP portion 44 may include a CDMA control loop processing function 100 that may automatically adjust gain, frequency and direct current (DC) offset of signals received by the transceiver IC 42. The CDMA control loop processing function 100 may be interfaced to an FM mode modulation/demodulation and control function 102, which is further interfaced to the FM co-processor 90 that may receive input from an FM RX interface 103. The block 102 may be further coupled to a CDMA/FM master control and real time operating system 104, which may be further interfaced to a CDMA time tracking function 106 and a test and debug function 108. In addition to being coupled to the block 104, the CDMA time tracking function 106 is further coupled to a CDMA system timer 110, which tracks sample times, symbol times and frame boundaries of information received from the transmit lineup 10. An audio-codec serial port 112 may be provided to couple data from outside the transceiver IC 42 into the block 104, via an audio codec interface 113. The transceiver IC 42 may also include an internal memory 114 that may be coupled to the DSP portion 44, which may also be coupled to an interface 118. Further, the transceiver IC 42 may also include a house-keeping analog to digital controller serial port 120 that may receive information from various analog inputs to, for example, adjust lookup tables used by the mobile communication system 40 to optimize the operation of the mobile communication system 40 by, for example, monitoring temperature.

As shown in FIG. 2B, the transceiver IC 42 may further include a microcontroller portion 130. The microcontroller portion 130 may include a man machine interface 132, a CDMA protocol stack 134 an SMS 136 and data services 138, each of which may be interfaced to a bus 140. The microcontroller portion 130 may also include a JTAG test interface 142 and a real time operating system 144. Various functions within the transceiver IC 42 may also be interfaced to the bus 140 disposed within the microcontroller portion 130. For example, a synchronous serial port 150, UARTS 152, a keypad interface 154, an external memory map interface 156, a general purpose timer 158, an interrupt controller 160, a direct memory access controller 162 and a watchdog timer 164 may also be coupled to the bus 140 of the microcontroller portion 130.

The blocks 150–164 may also be interfaced to additional circuitry or data sources that are external to the transceiver IC 42. For example, the synchronous serial port 150 may be communicatively coupled to external circuitry of the receiver system 40 via a serial port interface 166 and the UARTS 152 may be coupled to a data port interface 168 and a test interface 170. To provide a user interface, the keypad interface 154 may be communicatively coupled to a keypad (not shown) via a keypad interface 172. The mobile communication system 40 may also include additional external memory 174 that may be coupled to the external memory mapped interface 156, via a memory interface 176. Additionally, external interrupts may be generated by the receiver system 40 and may be coupled to the bus 140, via the interrupt controller 160 and an interrupt interface 178. The microcontroller portion 130 may also be interfaced to an internal boot ROM 180 and to a clock generation and power down control 182, which may receive a clock signal external to the transceiver IC 42, via the clock interface 184.

The microcontroller portion 130 may also be coupled to the interface 118, which enables the DSP portion 44 and the microcontroller portion 130 to exchange information. A general purpose digital input/output block 190 may be interfaced to both of the DSP portion 44 and the microcontroller portion 130 of the transceiver IC 42 to enable data to be coupled into and out of the transceiver IC 42, via a general purpose I/O (GPIO) bus 192. For example, an external memory 194 may be coupled to the general purpose digital input/output 180, via the GPIO bus 192. A general purpose analog output 196 may receive output signals from both the DSP portion 44 and the microcontroller portion 130 of the transceiver IC 42 and may couple such signals out of the transceiver IC 42, via PDM DAC outputs 198. In general, the transceiver IC 42 may also include a diagnostic interface 199 to which other components of the mobile communication system 40 may be interfaced.

Figure 3:
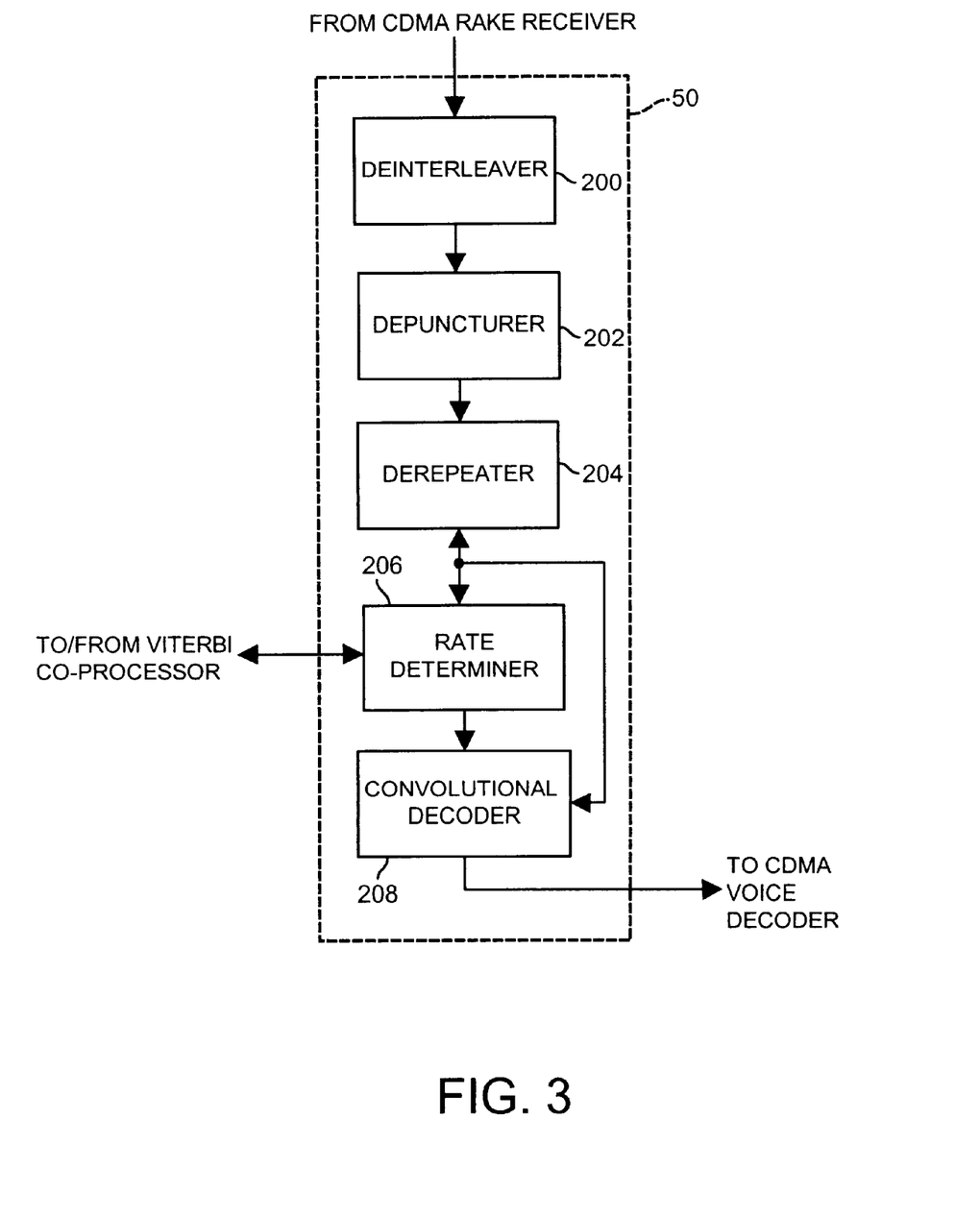
FIG. 3 is an exemplary block diagram of the CDMA channel decoder of FIG. 2A.

As shown in further detail in FIG. 3, the CDMA channel decoder 50 may include a deinterleaver 200, a depuncturer 202, a derepeater 204, a rate determiner 206 and a convolutional decoder 208. In practice, the CDMA channel decoder 50 receives a symbol stream from the CDMA RAKE receiver 46 and the deinterleaver 200 reassembles the symbol stream into the temporal order in which it was placed before it was fed into the interleaver 22 (FIG. 1). The symbol stream is coupled from the deinterleaver 200 to the depuncturer 202, which, in a known manner, depunctures the symbol stream before coupling the symbol stream to the derepeater 204.

As noted with respect to FIG. 1, the repeater 20 may repeat the symbols in the symbol stream various numbers of times to create a symbol stream having a symbol rate of 19.2 ksps. Accordingly, to decode the data that was originally encoded encoder 18 of FIG. 1, the derepeater 204 must eliminate any repeated symbols within the symbol bitstream. In practice the derepeater 204 may sum consecutive symbols that are repeated to derepeat the symbols stream. Because the bit rate the of bitstream coupled to the encoder 18 is not known at the mobile communication system 40, the rate determiner 206, which is of particular interest in FIG. 3, must determine the bit rate of the bitstream and must inform the derepeater 204 of the bit rate, so that the derepeater 204 may appropriately derepeat the symbol stream.

The rate determiner 206 may also couple the determined bit rate to the convolutional decoder 208, which may also receive the derepeated symbol stream from the derepeater 204. The convolutional decoder 208 appropriately decodes the derepeated signal according to the bit rate calculated by the rate determiner 206 to produce a CDMA voice encoded signal that is coupled to the CDMA voice decoder 52, before being decoded and coupled to the speaker 62. The rate determiner 206, as is described subsequently, may be interfaced to the Viterbi co-processor 58 and may use the Viterbi co-processor 58 to determine the bit rate of the digital information. Alternatively, as described hereinafter, the rate determiner 206 may calculate a syndrome by multiplying certain portions of the symbol stream from the derepeater 204 by certain of the polynomials used by the encoder 18 (FIG. 1) to encode the bitstream output from the frame and CRC module 16 (FIG. 1).

Figure 4:
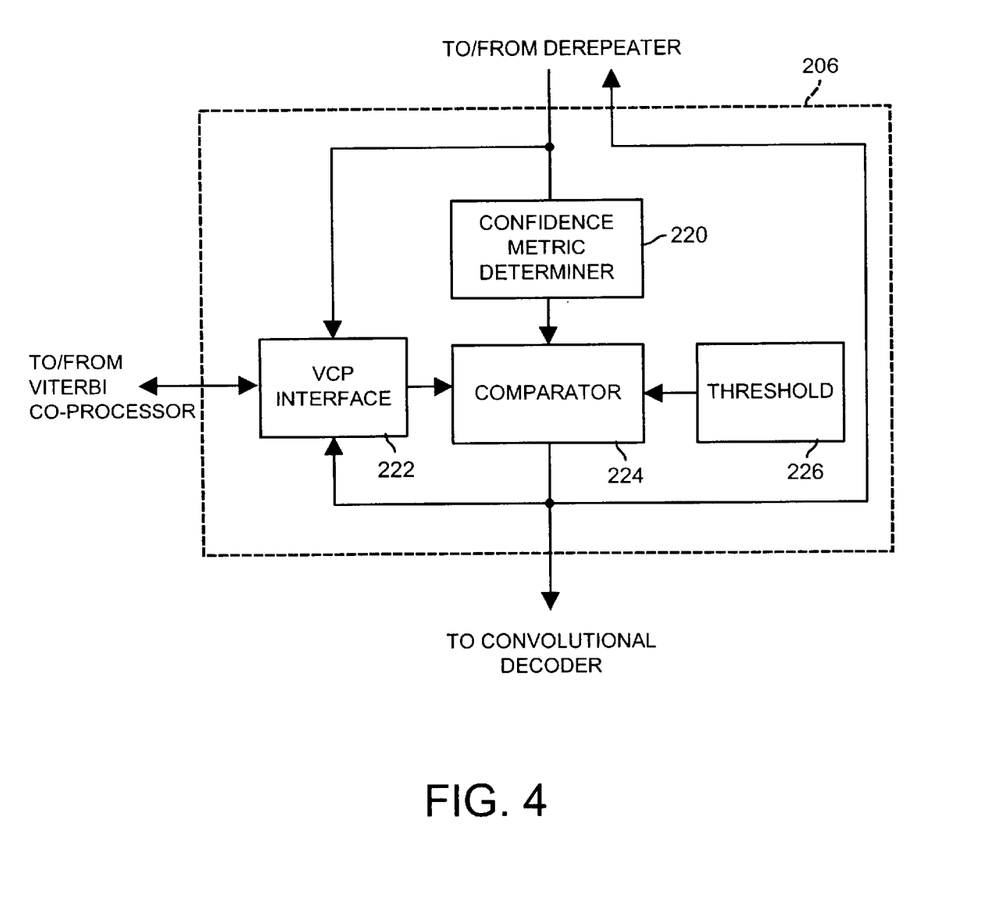
FIG. 4 is an exemplary block diagram of the rate determiner of FIG. 3.

The rate determiner 206, as shown in detail in FIG. 4, may include a confidence metric determiner 220, a Viterbi co-processor (VCP) interface 222, a comparator 224 and a threshold 226. In operation, the confidence metric determiner 220, the details of which are described in connection with FIG. 5, receives the symbol stream from the derepeater 204 and calculates a confidence metric based on a syndrome of the symbol stream. The confidence metric is coupled to the comparator 224, which compares the confidence metric to a threshold 226. Alternatively, the comparator 224 may compare numerous confidence metrics against one another to determine the best confidence metric before comparing the best confidence metric to the threshold 226.

The rate determiner 206 operates on the principle that a symbol stream that is improperly derepeated by the derepeater 204 will have a poor confidence metric, whereas a symbol stream properly derepeated by the derepeater 24 will have a good confidence metric. Accordingly, the symbol stream from the depuncturer 202 is derepeated by the deprepeater 204 assuming four different rates of repetition and a confidence metric is determined for each repetition rate. For example, the symbol stream from the depuncturer 202 may be derepeated eight times, four times, two times and once by the derepeater 204. The confidence metric determiner 220, in turn, calculates confidence metrics corresponding to each of the repetition rates (i.e., eight, four, two, and one) and outputs each of these confidence metrics to the comparator 224. The comparator 224 compares each of the confidence metrics against the other to determine the best confidence metric and compares the best confidence metric to the threshold 226. The symbol rate corresponding to the best confidence metric that satisfies the threshold 226 is output from the comparator 224 and coupled to the derepeater 204 and to the convolutional coder 208, so that the derepeater 204 may appropriately derepeat data from the depuncturer 202 and couple the appropriately derepeated data to the convolutional decoder 208, which will appropriately decode the information from the derepeater 204 based on the data rate determined by the comparator 224.

While the foregoing description of the rate determiner 206 specifies that the confidence metric determiner 220 determines a confidence metric for each of the various repetition rates before comparing the largest syndrome to the threshold 226, it will be appreciated by those having ordinary skill in the art that the confidence metric determiner 220 and the comparator 224 may cooperate to determine a confidence metric for a particular data repetition rate and may then compare that particular confidence metric to the threshold 226 and, if the confidence metric satisfies the threshold, may accept the data rate corresponding to the confidence metric that satisfies the threshold 226 as the rate at which the data was encoded by the encoder 18 of transmit lineup 10 of FIG. 1. Accordingly, the comparator 224 may or may not compare various confidence metrics against one another and may merely compare confidence metrics to the threshold 226 to determine the rate at which the data was encoded by the encoder 18 of transmit lineup 10.

Figure 5:
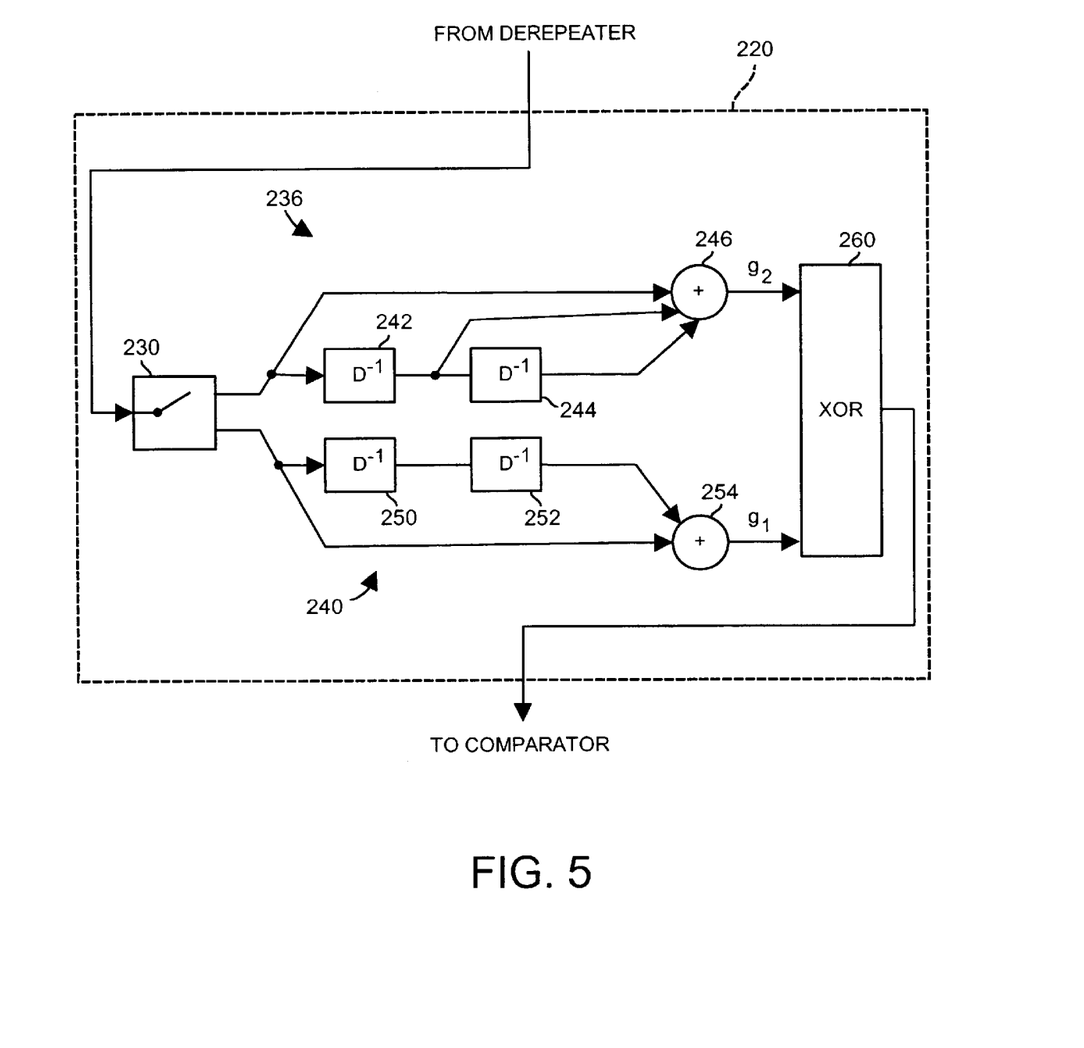
FIG. 5 is an exemplary block diagram of the confidence metric determiner of FIG. 4.

As shown in FIG. 5, the confidence metric determiner 220 may include a switch 230, one output of which is coupled to a first polynomial generator 236 and an output of which is coupled to a second polynomial generator 240. The first and second polynomial generators 236, 240 process the symbol stream from the switch 230 to generate first and second syndromes that will be used to generate a confidence metric. As shown in FIG. 5, the first polynomial generator 236 may multiply a symbol from the switch 230 by polynomial g2 and the second polynomial generator 240 may multiply a symbol from the switch 230 by polynomial g1. The switch 230 is controlled to route certain symbols of the bitstream to one of the first and second polynomial generators 236, 240.

The first polynomial generator 236 may include two delay blocks 242 and 244, the outputs of which are interconnected with an adder 246. The second polynomial generator 240 may include two delay blocks 250 and 252. The input to the delay block 250 and the output of the delay block 252 are coupled to an adder 254. As will be appreciated by those having ordinary skill in the art, the polynomials g1 and g2 are equivalent to $1+D^2$ and $1+D+D^2$, respectively.

The confidence metric 220 determiner of FIG. 5 is merely exemplary and assumes that the encoder 18 (FIG. 1) encoded the data from the frame and CRC module 16 (FIG. 1) into a symbol stream using polynomials g1 and g2 and further assumes that the odd symbols received from the derepeater 204 were multiplied by g1 and that the even symbols received from the derepeater 204 were multiplied by g2. The confidence metric determiner 220 of FIG. 5 is designed to determine two syndromes by multiplying the odd symbols from the derepeater 204 by polynomial g2 and by multiplying the even symbols from the derepeater 204 by polynomial g1. The switch 230 is controlled to ensure that the odd symbols are routed to the polynomial generator 236 and that the even symbols are routed to the polynomial generator 240.

Because at the encoder 18 the odd symbols were created by multiplying a bit by the polynomial g1 and the even symbols were created by multiplying a bit by g2, the multiplication of the odd symbols by g2 and the even symbols by g1 should result in identical syndrome bitstreams produced by the adders 246 and 254 because the identical bitstream has been multiplied by both the polynomial g1 and the polynomial g2, whether the multiplication took place in the encoder 18 or in the confidence metric determiner 220. When the symbol stream from the derepeater 204 has been appropriately derepeated (which assumes derepetition at the proper data rate) the syndromes output from adders 246 and 254 will be nearly identical. Conversely, if the symbol stream from the depuncturer 202 is not derepeated at the proper rate by the derepeater 204, the syndromes output from adders 246 and 254 will not be similar.

The confidence metric determiner 220 may include an XOR function 260 that may generate an output indicative of the differences between the syndromes output from the adders 246 and 254. The larger the output produced by the XOR function 260, the less similar the syndromes are and the less likely it is that the symbol stream from the depuncturer 202 was appropriately processed by the derepeater 204. Accordingly, the output of the XOR function 260 is the confidence metric that coupled to the comparator 224 so that the confidence metrics for various symbols output of the XOR function 230 may be compared to the threshold 226.

As will be appreciated by those having ordinary skill in the art, more or fewer polynomials may be used within the encoder 18. As the polynomials within the encoder 18 are changed, the polynomials within the confidence metric determiner 220 must also be changed. For example, if a bitstream is encoded so that a particular bit b1 is multiplied by each of polynomials g1, g2 and g3, thereby resulting in three symbols created from the products b1g1, b1g2 and b1g3, the confidence metric determiner 220 must multiply each of the products from the encoder 18 by the polynomials that the bit b1 was not multiplied by within the encoder 18. Accordingly, the confidence metric determiner 220 must create products b1g1g2g3, b1g2g1g3 and b1g3g1g2, all of which will be identical or nearly identical if the bitstream from the derepeater 204 was derepeated at the proper bit rate. Accordingly, it is contemplated that more complex confidence metric determiners 220 may be developed in accordance with the disclosure provided herein.

Figure 6:
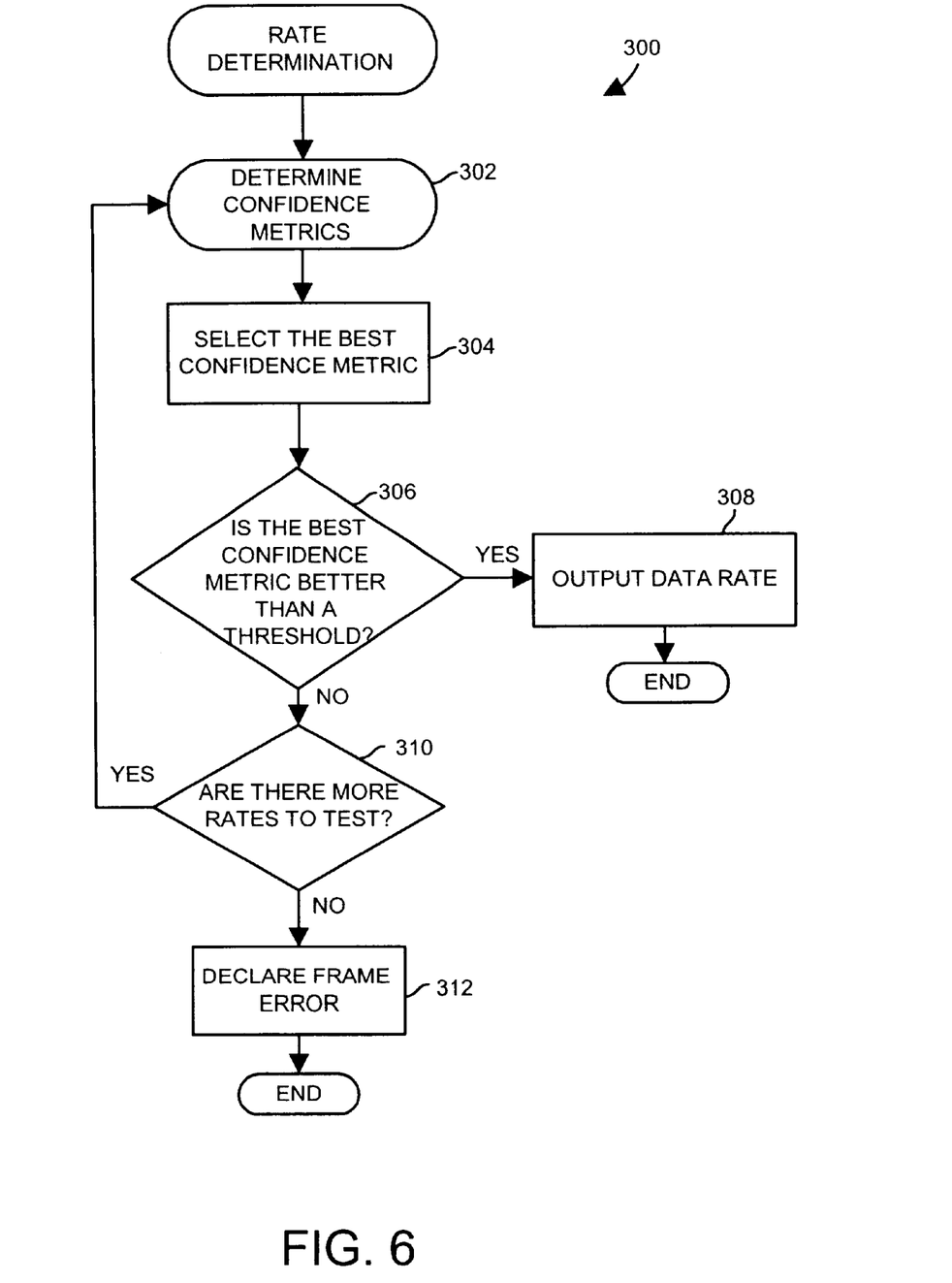
FIG. 6 is an exemplary flow diagram of one embodiment of a rate determination process.

Turning now to FIG. 6, a rate determination process 300 is shown as a sequence of blocks in a flow diagram. As will be appreciated by those having ordinary skill in the art, the blocks shown in FIG. 6 may be implemented using instructions written in a suitable computer language, wherein the instructions may be stored in the internal memory 114 of the transceiver IC 42, in the external memory 182 or in any other suitable memory that is interfaced to the DSP portion 44 of the transceiver IC 42. The instructions representing the blocks shown in FIG. 6 may be read from the memories and executed by the DSP portion 44 to carry out the process 300.

Execution of the process 300 begins at a block 302, which determines a confidence metric for a one or more particular assumed data rates. Further details regarding the block 302 are provided with respect to FIG. 8. After the block 302 has determined confidence metrics, a block 304 selects the best confidence metric or metrics produced by the block 302 and a block 306 compares the best confidence metric to a threshold. As noted previously with respect to FIG. 5, the confidence metric may be produced by XORing two syndromes together to determine the differences therebetween. If the block 306 determines that the confidence metric is better than the threshold, control may pass to a block 308, which outputs the data rate corresponding to the best confidence metric, before execution of the process 300 ends.

If, however, the block 306 determines that the best confidence metric is not better than the threshold, control may pass from the block 306 to a block 310, which determines if there are no more rates to test. If there are more rates to test, control may pass from the block 310 back to the block 302, which determines confidence metrics for further assumed bit rates. Accordingly, the execution of blocks 302–310 iterates as long as there are more rates to test and none of the confidence metrics that are calculated at the block 304 are better than the threshold. If, however, no confidence metric are better than the threshold and there are no more rates to test, the block 310 may pass control to a block 312, which may declare a frame error before ending the process 300. Alternatively, if a rate must be selected even if the best confidence metric is not better than the threshold, the block 312 may output the data rate associated with the best confidence metric, rather than declaring a frame error.

Although the process 300 shown in FIG. 6 discloses determining confidence metrics and comparing them to the threshold on a one at a time basis, those having ordinary skill in the art will readily recognize that the process 300 could alternatively calculate confidence metrics for each of the bit rates before 5 comparing those confidence metrics to one another and further comparing the best confidence metric to the threshold.

Figure 7:
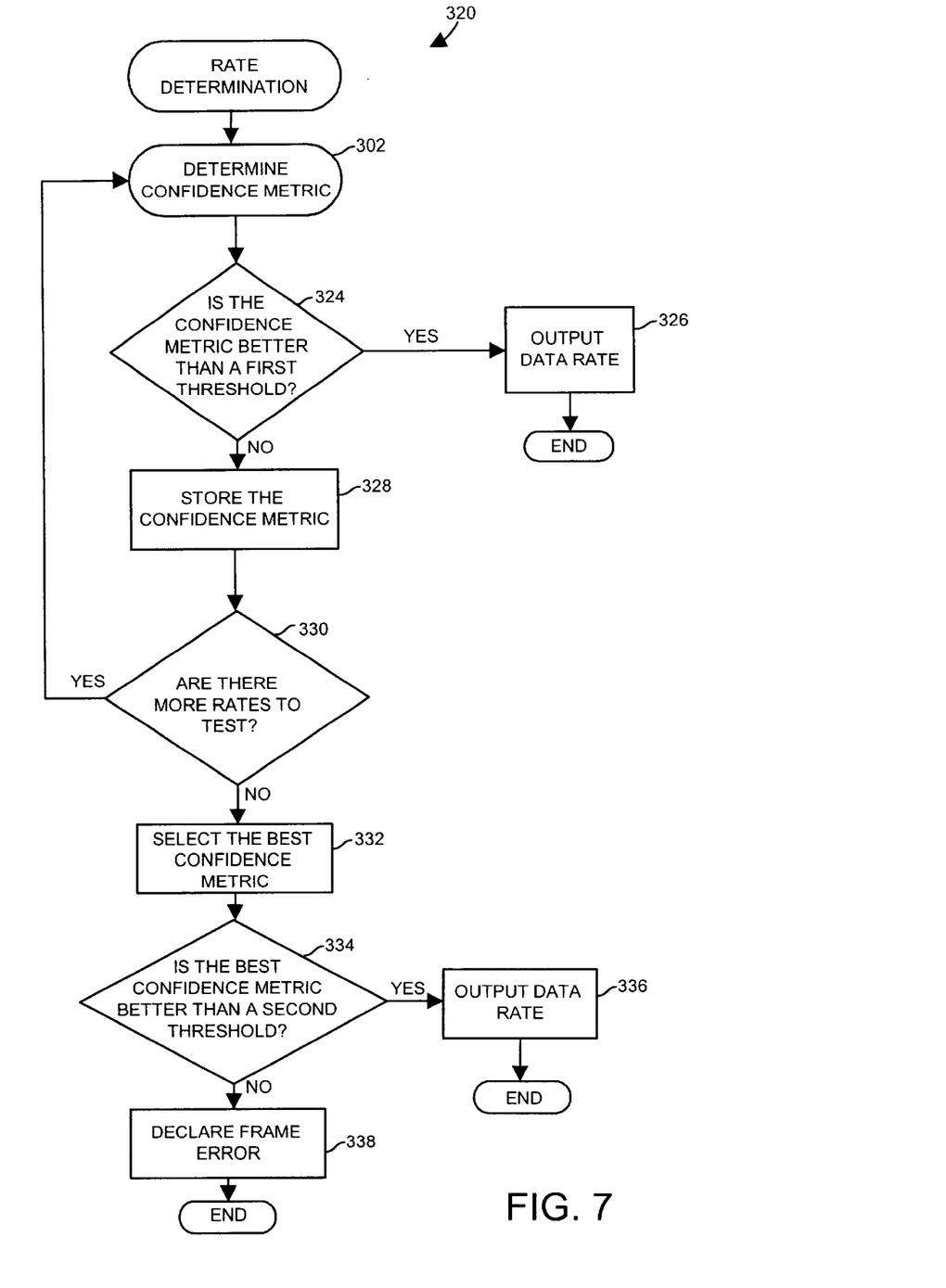
FIG. 7 is an exemplary flow diagram of a second embodiment of a rate determination process.

FIG. 7 discloses an alternate rate determination process 320. The process 320 may begin execution at a block 302, which like the block 302 shown in FIG. 6, determines a confidence metric associated with a data rate. After the block 302 has determined a confidence metric, control passes to a block 324, which determines if the confidence metric is better than a first threshold. If the confidence metric is better than the first threshold, control passes from the block 324 to a block 326, which outputs the data rate corresponding to the confidence metric that is better than the first threshold.

If the block 324 determines that the confidence metric is not better than the first threshold, control passes from the block 324 to a block 328, which stores the confidence metric before passing control to a block 330. The block 330 determines if there are additional rates to test. If there are additional rates to test, control passes to the block 302. As long as a confidence metric is not better than the first threshold and there are more rates to test, control of the process 320 cycles between the block 302 and the block 330. However, when the block 330 determines that there are no more rates to test, control passes to a block 332. The block 332 selects the best metric from the metrics that were stored by the block 328 before passing control to a block 334.

At the block 334, the best confidence metric, which was selected by the block 332, is compared to a second threshold. If the block 334 determines that the best confidence metric is better than a second threshold, control passes to a block 336, which outputs the data rate associated with the best confidence metric. If, however, the block 324 determines that the best confidence metric is not better than the second threshold, control passes to a block 338. The block 338, like the block 312 of FIG. 6, declares that a frame error has occurred because none of the data rates produces a metric that satisfies either of the first or second thresholds.

Figure 8:
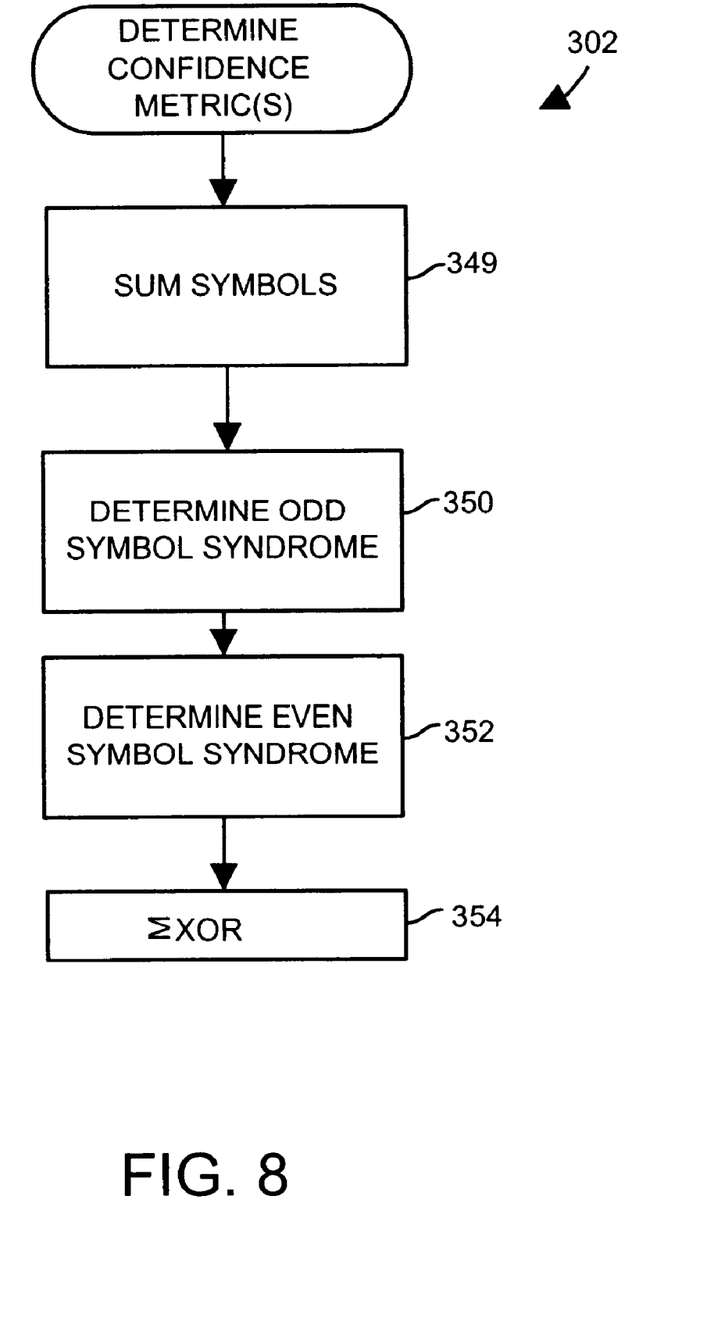
FIG. 8 is an exemplary block diagram of the determine confidence metric process of FIGS. 6 and 7.

Turning now to FIG. 8, additional detail regarding the determine confidence metric process or block 302 is shown. The description of FIG. 8 corresponds to the syndrome determiner 220 of FIG. 5. As with the rate determiner 206 of FIG. 5, the process 302 of FIG. 8 assumes that the encoder 18 of FIG. 1 encoded the data from the frame and CRC module 16 using polynomials g1 and g2 and further assumes that the odd symbols received from the derepeater 204 were multiplied by g1 and that the even symbols received from the derepeater 204 were multiplied by g2.

The execution of the process 302 begins at a block 349 at which symbols are summed together depending on the assumed data rate. For example, if the assumed data rate is 9.6 kbps, no symbols will be summed. Conversely, for example, if the assumed data rate is 1.2 kbps, the block 349 will sum eight symbols together. The functionality of the block 349 is like the derepeater 204 (FIG. 3). After the block 349 has summed the appropriate number of symbols, a block 350 determines an odd symbol syndrome by running the information from the block 349 through the polynomial generator g2. After the odd symbols have been run through the polynomial generator g2, control passes to a block 352 at which an even symbol syndrome is determined by running all of the even symbols from the block 349 through polynomial generator g1. Accordingly, the blocks 350 and 352 calculate syndromes for the signal from the block 349 for a particular assumed data rate. After the execution of blocks 350 and 352, a block 354 calculates a confidence metric based on the syndromes calculated by blocks 350 and 352 by, for example, accumulating a running sum of the results of an XOR of the bits created by the blocks 350 and 352. Accordingly, the confidence metric corresponds to the number of similar bits between signals produced by the block 350 and the block 352. The larger the confidence metric, the less likely it is that the appropriate data rate has been assumed.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

It is claimed:

1. A method of determining a data rate at which data is encoded within a digital signal, wherein the digital signal comprises a first plurality of symbols that have been previously multiplied by a first polynomial and a second plurality of symbols that have been previously multiplied by a second polynomial, the method comprising:
    selecting an assumed data rate at which data may be encoded within the digital signal;
    determining a first syndrome of the digital signal for the assumed data rate by multiplying the first plurality of symbols by the second polynomial;
    determining a second syndrome of the digital signal for the assumed data rate by multiplying the second plurality of symbols by the first polynomial;
    determining a confidence metric related to the first syndrome and the second syndrome;
    comparing the confidence metric to a threshold; and
    producing an indication that the assumed data rate is the data rate at which data is encoded within the digital signal if the confidence metric satisfies the threshold.

2. The method of claim 1, further comprising combining certain ones of the first plurality of symbols based on the assumed data rate.

3. The method of claim 1, further comprising producing an indication that the assumed data rate is not the data rate at which data is encoded within the digital signal if the confidence metric does not satisfy the threshold.

4. The method of claim 3, wherein the assumed data rate is a first assumed data rate, the confidence metric is a first confidence metric, the method further comprising selecting a second assumed data rate in response to the indication that the first assumed data rate is not the data rate at which data is encoded within the digital signal, determining a third syndrome and a forth syndrome for the second assumed data rate and determining a second confidence metric related to the third syndrome and the fourth syndrome.

5. The method of claim 4, wherein the threshold is a first threshold, further comprising determining which of the first and second confidence metrics is a best confidence metric and comparing the best confidence metric to a second threshold.

6. The method of claim 1, wherein determining the confidence metric comprises comparing the first syndrome to the second syndrome to produce the confidence metric.

7. The method of claim 6, wherein comparing the first syndrome to the second syndrome comprises determining a number of bit differences between the first syndrome and the second syndrome, such that a best confidence metric has few bit differences between the first syndrome and the second syndrome.

8. A method of determining a data rate at which data is encoded within a digital signal, wherein the digital signal comprises a first plurality of symbols that have been previously multiplied by a first polynomial and a second plurality of symbols that have been previously multiplied by a second polynomial, the method comprising:
    selecting a plurality of assumed data rates at which data may be encoded within the digital signal;
    determining a plurality of syndromes of the digital signal by multiplying the first plurality of symbols by the second polynomial to produce a first syndrome and multiplying the second plurality of symbols by the first polynomial to produce a second syndrome, wherein each one of the plurality of syndromes is related to each one of the plurality of assumed data rates;
    determining a plurality of confidence metrics, wherein each one of the plurality of confidence metrics is related to each one of the plurality of syndromes;
    determining a best confidence metric of the plurality of confidence metrics, wherein the best confidence metric has a related assumed data rate;
    comparing the best confidence metric to a threshold; and
    producing an indication that the assumed data rate related to the best confidence metric is the data rate at which data is encoded within the digital signal if the best confidence metric satisfies the threshold.

9. The method of claim 8, further comprising producing an indication that the assumed data rate related to the best confidence metric is not the data rate at which data is encoded within the digital signal if the best confidence metric does not satisfy the threshold.

10. The method of claim 8, wherein determining the plurality of confidence metric comprises the first syndrome to the second syndrome to produce the confidence metric.

11. The method of claim 10, wherein comparing the first syndrome to the second syndrome comprises determining a number of bit differences between the first syndrome and the second syndrome, such that a best confidence metric has few bit differences between the first syndrome and the second syndrome.

12. A system adapted to determine a data rate at which data is encoded within a digital signal, wherein the digital signal comprises a first plurality of symbols that have been previously multiplied by a first polynomial and a second plurality of symbols that have been previously multiplied by a second polynomial, the system comprising:
- a derepeater adapted to process the digital signal according to an assumed data rate at which data may be encoded within the digital signal;
- a syndrome determiner coupled to the derepeater and adapted to determine a syndrome of the digital signal for the assumed data rate and to multiply the first plurality of symbols by the second polynomial to produce a first syndrome to multiply the second plurality of symbols by the first polynomial to produce a second syndrome and to compare the first syndrome to the second syndrome to produce a confidence metric related to the first syndrome and the second syndrome; and
- a comparator coupled to the syndrome determiner and adapted to compare the confidence metric to a threshold and to produce an indication that the assumed data rate is the data rate at which data is encoded within the digital signal if the confidence metric satisfies the threshold.

13. The system of claim 12, wherein the comparator s further adapted to produce an indication that the assumed data rate is not the data rate at which data is encoded within the digital signal if the confidence metric does not satisfy the threshold.

14. A system adapted to determine a data ate at which data is encoded within a digital signal, wherein the digital signal comprises a first plurality of symbols that have been previously multiplied by a first polynomial and a second plurality of symbols that have been previously multiplied by a second polynomial, the system comprising:
- a derepeater adapted to process the digital signal according to a plurality of assumed data rates at which data may be encoded within the digital signal;
- a confidence metric determiner coupled to the derepeater and adapted to multiply the first plurality of symbols by the second polynomial to produce a first syndrome, to multiply the second plurality of symbols by the first polynomial to produce a second syndrome and to determine a plurality of confidence metrics based on the first syndrome and the second syndrome; and
- a comparator coupled to the confidence metric determiner and adapted to determine a best confidence metric of the plurality of confidence metrics, to compare the best confidence metric to a threshold and to produce an indication that the assumed data rate related to the best confidence metric is the rate at which data is encoded within the digital signal if the best confidence metric satisfies the threshold.

15. The system of claim 14, wherein the comparator is further adapted to produce an indication that the assumed data rate related to the best confidence metric is not the data rate at which data is encoded within the digital signal if the confidence metric does not satisfy the threshold.

16. A rate determiner for use in a receiver including a processor, wherein the rate determiner is adapted to determine a data rate at which data is encoded within a digital signal, wherein the digital signal comprises a first plurality of symbols that have been previously multiplied by a first polynomial and a second plurality of symbols that have been previously multiplied by a second polynomial, the rate determiner comprising:
- a memory;
- a first set of instructions stored on the memory and adapted to cause the processor to select an assumed data rate at which data may be encoded within the digital signal;
- a second set of instructions stored on the memory and adapted to cause the processor to multiply the first plurality of symbols by the second polynomial to produce the first syndrome and to multiply the second plurality of symbols by the first polynomial to produce a second syndrome for the assumed data rate;
- a third set of instructions stored on the memory and adapted to cause the processor to determine a confidence metric related to the first syndrome and the second syndrome;
- a fourth set of instructions stored on the memory and adapted to cause the processor to compare the confidence metric to a threshold; and
- a fifth set of instructions stored on the memory and adapted to cause the processor to produce an indication that the assumed data rate is the data rate at which data is encoded within the digital signal if the confidence metric satisfies the threshold.

17. The rate determiner of claim 16, further comprising a sixth set of instructions adapted to cause the processor to derepeat the digital signal based on the assumed data rate.

18. The rate determiner of claim 16, further comprising a sixth set of instructions adapted to cause the processor to produce an indication that the assumed data rate is not the data rate at which data is encoded within the digital signal if the confidence metric does not satisfy the threshold.

19. The rate determiner of claim 18, wherein the assumed data rate is a first assumed data rate, the confidence metric is a first confidence metric the rate determiner further comprising a seventh set of instructions adapted to cause the processor to select a second assumed data rate in response to the indication that the first assumed data rate is not the data rate at which data is encoded, to determine a third syndrome and a fourth syndrome for the second assumed data rate and to determine a second confidence metric related to the third syndrome and the fourth syndrome.

20. The rate determine of claim 19, wherein the threshold is a first threshold, further comprising an eighth set of instructions adapted to cause the processor to determine which of the first and second confidence metrics is a best confidence metric and to compare the best confidence metric to a second threshold.

21. The rate determiner of claim 20, wherein the third set of instructions includes instructions adapted to cause the processor to compare the first syndrome to the second syndrome to produce the confidence metric.

22. A rate determiner for use in a receiver including a processor wherein the rate determiner is adapted to determine a rate at which data is encoded within a digital signal, wherein the digital signal comprises a first plurality of symbols that have previously been multiplied by a first polynomial and a second plurality of symbols that have been previously multiplied by a second polynomial, the rate determiner comprising:
- a memory;

a first set of instructions stored on the memory and adapted to cause the processor to select a plurality of assumed data rates at which data may be encoded within the digital signal;

a second set of instructions stored on the memory and adapted to cause the processor to multiply the first plurality of symbols by the second polynomial to produce a first syndrome and to multiply the second plurality of bits by the first polynomial to produce a second syndrome of the digital signal related to the assumed data rates;

a third set of instructions stored on the memory and adapted to cause the processor to determine a plurality of confidence metrics, wherein each one of the plurality of confidence metrics is related to the first syndrome and the second syndrome;

a fourth set of instructions stored on the memory and adapted to cause the processor to determine a best confidence metric of the plurality of confidence metrics, wherein the best confidence metric has a related assumed data rate;

a fifth set of instructions stored on the memory and adapted to cause the processor to compare the best confidence metric to a threshold; and a sixth set of instructions stored on the memory and adapted to cause the processor to produce an indication that the assumed data rate related to the best confidence metric is the data rate at which data is encoded within the digital signal if the best confidence metric satisfies the threshold.

23. The rate determiner of claim 22, further comprising a seventh set of instructions stored on the memory and adapted to cause the processor to produce an indication that the assumed data rate related to the best confidence metric is not the data rate at which data is encoded within the digital signal if the confidence metric does not satisfy the threshold.

24. The rate determiner of claim 22, wherein the third set of instructions includes instructions adapted to cause the processor to compare the first syndrome to the second syndrome to produce the confidence metric.

* * * * *